May 14, 1940.  G. E. BEHARRELL ET AL  2,200,829
FLUID PRESSURE BRAKE CONTROL APPARATUS
Filed Dec. 10, 1932   8 Sheets-Sheet 1

UNITED STATES PATENT OFFICE 2,200,829

FLUID-PRESSURE BRAKE CONTROL APPARATUS

George Edward Beharrell, Streetly, Joseph Wright, Stoke Park, and Henry Trevaskis, Sutton Coldfield, England, assignors to Dunlop Rubber Company Limited, London, England, a British company Application December 10, 1938, Serial No. 245,006
In Great Britain December 10, 1937

10 Claims. (Cl. 303—6)

This invention concerns improvements in or relating to fluid-pressure apparatus for controlling the operation of brakes on aircraft.

In particular the invention concerns hydraulic apparatus for controlling the supply of liquid at equal or unequal braking pressures to two or more brakes or groups of brakes on opposite sides of the aircraft, the said supply being force fed from a reservoir to the apparatus as for instance by a suitable pump.

The brake applying means to which the liquid is supplied may each consist of a spring loaded annulus which is expanded by liquid pressure to cause the brake shoes to move radially into braking contact with a brake drum the springs serving to collapse the annulus and thereby return the liquid to the reservoir when the brakes are inoperative.

The invention facilitates the control of brake pressure by relieving the pilot of the physical effort required to overcome the resistance of spring loaded valves, the necessary force for this purpose being provided by the pressure liquid itself.

A further feature of the invention is the ability to obtain a progressively varying ratio of brake pressure between brakes on opposite sides of the aircraft consequent upon deflection of the rudder bar.

In our invention a pair of fluid inlet valves is provided to admit fluid from an accumulator or other source of fluid under pressure to the control apparatus and an exhaust outlet is provided for the return of this fluid. Normally when the brake is not applied the fluid inlet valves are closed and the fluid outlet open. To apply pressure to the brakes an actuating mechanism tilts a common guiding element, such as a lever, first to close the outlet opening and then to open the inlet valves. For this purpose the lever is rocked until a closing plug attached to one end seats on the outlet opening whereupon the lever tilts on this plug as a fulcrum and lifts the inlet valve. The outlet opening is spring supported so that as pressure builds up it is forced downwardly until, for any displacement of the lever, the lowering of the fulcrum permits the inlet valves to close. In this way the pressure applied to the brakes is limited by the displacement of the lever actuating mechanism inasmuch as for any position of this mechanism the outlet opening must be depressed progressively until the inlet valve closes.

The levers for the inlet valves are displaced independently of each other from a common actuating station. This station is generally a lever on the control stick of the airplane. The displacement of the levers for a given displacement of the control lever may be equal or may be proportioned in accordance with the position of the rudder. For this purpose the movement of the lever is transmitted through a flexible connection to a pair of members having shoulders so positioned that the connections to the valve actuating lever are substantially parallel to and displaced from the flexible connection to the control lever and, therefore, form a couple between the flexible connection and each of the valve control levers which would cause these couple members to turn or rotate unless prevented. Tiltable cam or restraining members are provided, however, which when the rudder of the control mechanism is balanced prevent substantial turning of the couple members. However, when the rudder tilts in one direction it releases one of the cam or restraining members and in the other direction releases the other, the extent of release depending upon the extent to which the rudder is turned. Accordingly, the brake application for one control valve may correspond to the full displacement of the control lever or even exceed it, while the displacement transmitted to the other valve member may be only a fraction of the control lever displacement.

The various features of the invention are illustrated by way of example in the accompanying drawings in which—

Fig. 8 is a sectional elevation of a portion of the device showing the communication between an exhaust outlet chamber and a liquid return conduit, the section being taken on the line G—H of Fig. 3. Fig. 9 is a section on the line L—M of Fig. 2 showing the cam members and rollers hereinafter referred to.

Figure 6:
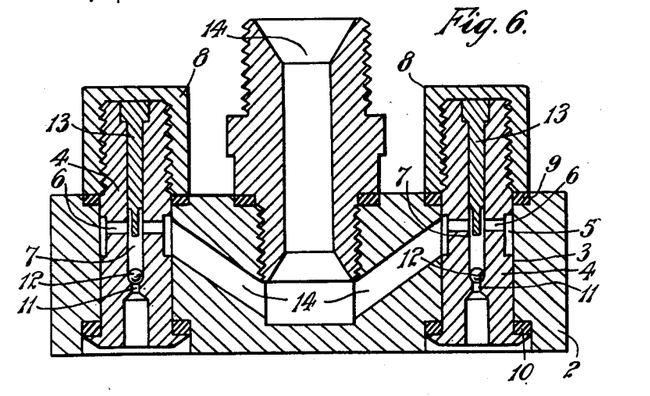
Fig. 6 is a sectional elevation of the top cover part, the section being taken along the line A—B of Fig. 5.
Figure 7:
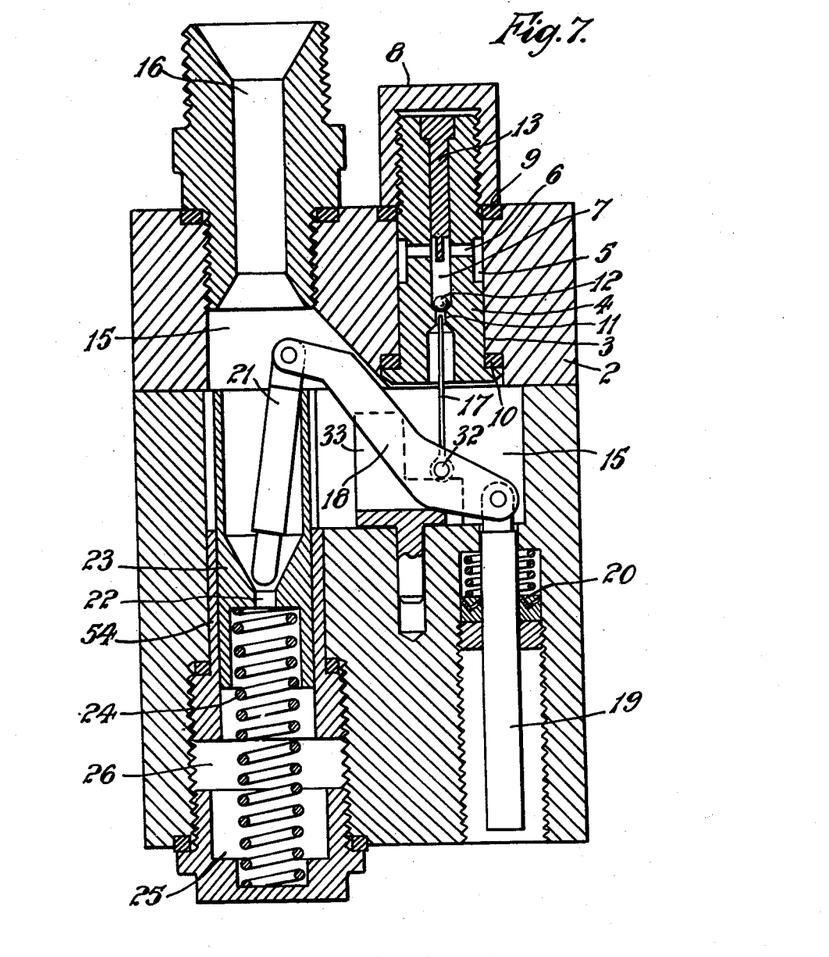
Fig. 7 is a sectional side elevation of the device, the section being taken at a position corresponding to the line C—D of Fig. 5.

A convenient embodiment of the invention comprises a casing 1 having a top cover part 2 formed with a pair of cylindrical holes 3 (Figs. 1, 6 and 7) which are spaced apart along parallel axes and which receive a pair of inlet valve units. Each inlet valve unit comprises a body 4 threaded into its respective hole 3, each said body being formed with an annular groove 5 adjacent its centre which groove is pierced by a plurality of radial channels 6. The inner ends of these channels radiate from a central bore 7 of circular cross-section and small diameter which extends axially through the body 4. The body 4 is fixed to the cover part 2 by a cap 8 screwed on the body, the joint being sealed by a washer 9 positioned in an annular recess in the surface of the casing cover. The inner end of the body 4 is flanged and similarly makes sealing contact with a washer 10 located in a recess in the body of the casing cover part 2.

The diameter of the bore 7 formed in the body 4 is reduced adjacent its center to provide a neck 11 which is formed with a tapered seat for a ball valve 12. The upward movement of the ball 12 is limited by a pin 13 in the bore 7 of the body 4, so that there is no liability of the ball lodging in the radial holes 6 in such body. The annular groove 5 in each inlet valve unit body 4 registers with an inlet port 14 (Fig. 6) formed in the casing part 2 through which ports pressure liquid is admitted to fill the narrow bore 7 in the body whence it is prevented from flowing into a chamber 15 (Fig. 7) in the casing 1 and cover 2 by the ball valve 12. Each of the pair of chambers 15 has an outlet port 16 which is connected to one of the brakes, or groups of brakes at each side of the aircraft.

In the inoperative position, i. e. with the brakes "off," the ball 12 seals the aperture in the reduced diameter portion 11 of the aperture 7 through the body of the valve unit, and such ball is normally held on its seating by the pressure of liquid in the aperture 7, but is displaceable from its seat by thrust exerted on a spindle 17, the lower end of which is pivoted to a rocking lever 18 the major portion of which is inclined at an angle to the said spindle 17.

One end of each rocking lever 18 is pivoted to a thrust rod 19 which slides through a sealing washer 20 along an axis parallel to that of the inlet valve units, and the other end of each rocking lever is pivoted to one end of an exhaust valve spindle 21 the free end of which is rounded and adapted, in the normal inoperative position of the parts, to lie clear of the base of a conical hole which terminates in an orifice 22 constituting an exhaust port formed in a sleeve 23, which sleeve is spring loaded by means of a compression spring 24 which bears at one end against the underside of the sleeve and at the other end against a cap 25 screwed in the base of the casing 1. The said sleeves 23 are capable of axial movement along axes which are offset from and are between and parallel to the axes of the inlet valves, and an exhaust chamber 26 is provided below each sleeve, and such chambers are connected by passages 27 which open to a chamber 28 connected to the liquid reservoir 50 by a return pipe 51.

The sleeves 23 are each slidably mounted in a cast iron bush 54 fixed in the casing 1, and to ensure an easy sliding fit without liability of liquid leakage the external surface of each sleeve has a series of very fine grooves spaced apart, thus retaining a certain amount of liquid between the sleeve and its bush. This arrangement obviates the need for packing glands. The upward movement of each of the sleeves 23 is limited by the abutment of the upper end of the sleeve with the underside face of the top cover part 2, at points on each side of the chamber 15.

Each inlet valve operating spindle 17 is pivoted on a pin 32 fixed to the rocking lever 18 at a point substantially a quarter of the distance between the ends of the lever, which are pivoted to the thrust rod 19 and to the exhaust valve spindle 21 respectively, in order to provide the mechanical advantage necessary to ensure ease of displacement of the inlet ball valves 12 against the high pressure of the liquid supply acting against each ball. The lever 18 is provided with trunnion pins formed by the ends of the pin 32 (Figs. 1 and 11) and such trunnions fulcrum on the edges of a channel shaped cradle or carrier 33 fitted in a recess open to the aforesaid chamber 15.

Figure 4:
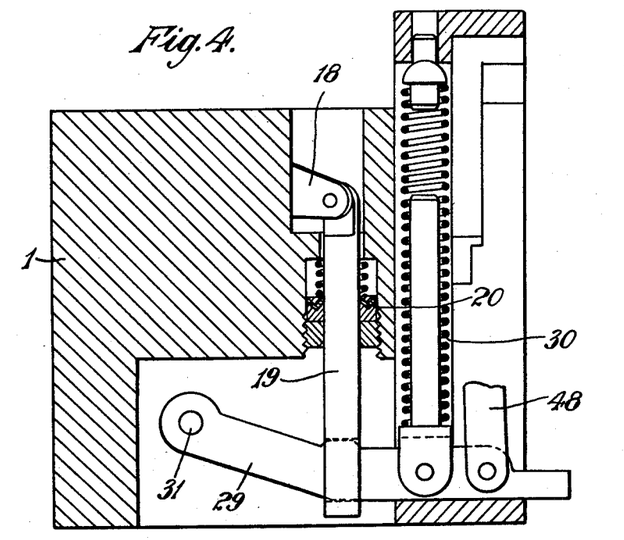
Fig. 4 is a section taken on the line E—F of Fig. 3.
Figure 5:
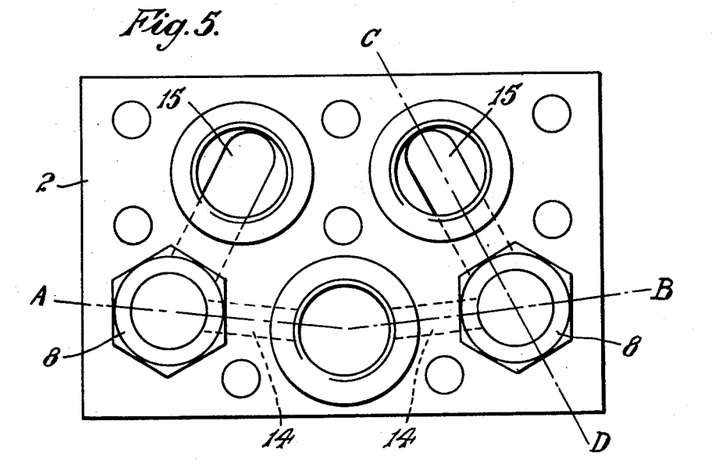
Fig. 5 is a plan view of the top cover part hereinafter mentioned.

Each thrust rod 19 has a notch in the side face near its lower end (Figs. 1 and 4) which is contacted by a shoulder formed on the intermediate portion of each respective one of a pair of operating levers 29 each of which levers is returned by a compression spring 30 positioned along an axis parallel to that of the rod. Each thrust rod is pivoted to the casing 1 by means of the screw pins 31 so as to be movable at right angles to the thrust rod contacting therewith.

Figure 1:
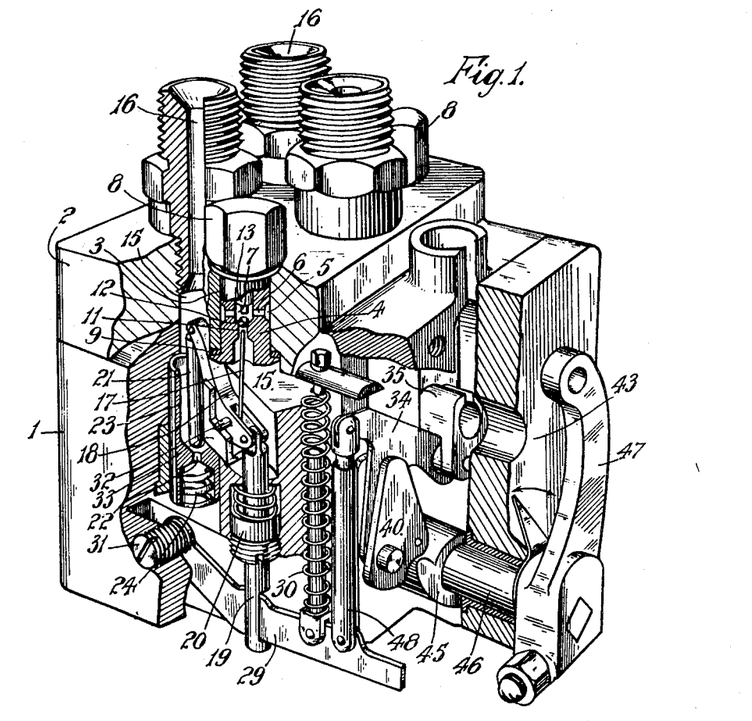
Fig. 1 is a perspective view of the control device constructed according to this invention, parts being broken away to show clearly details of the internal construction.
Figure 2:
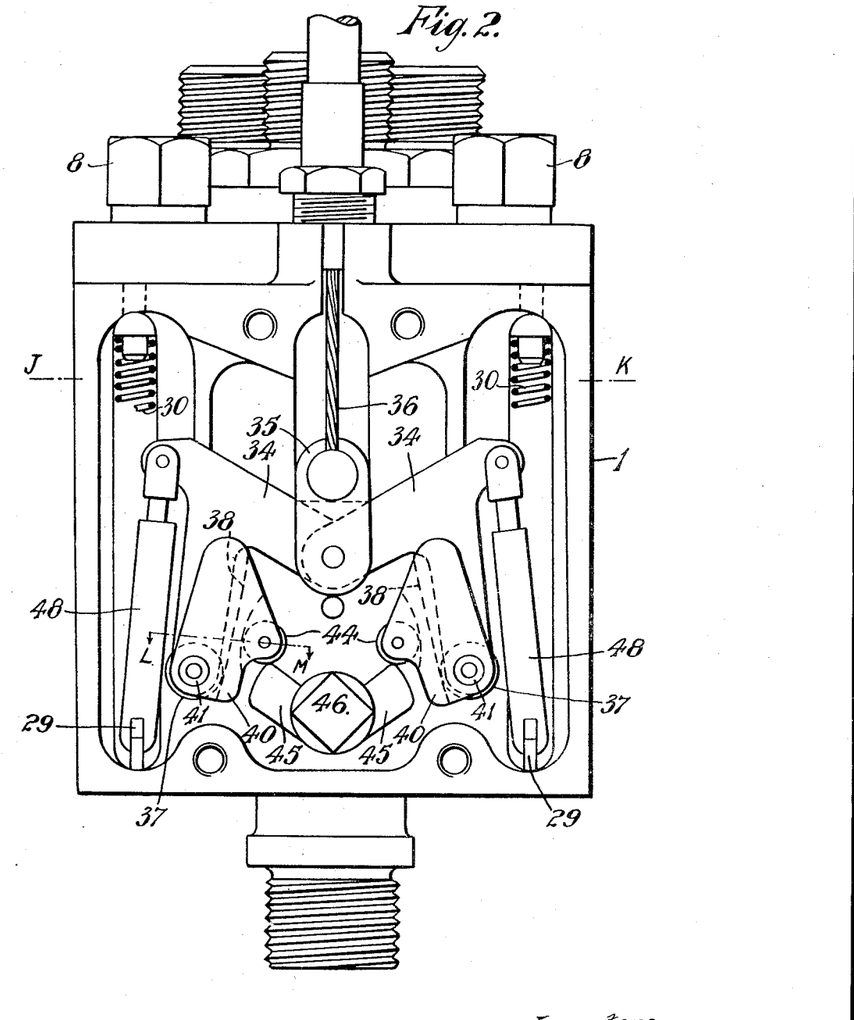
Fig. 2 is an elevation of the device with the front cover removed.
Figure 3:
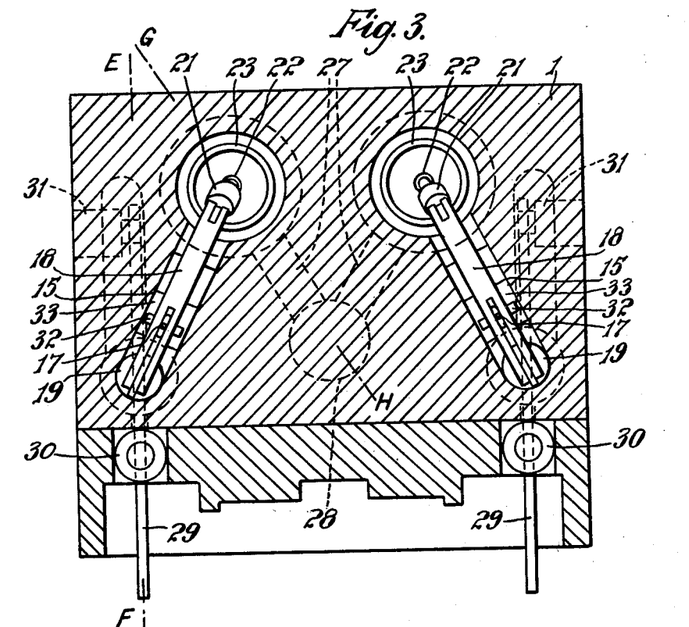
Fig. 3 is a sectional plan view of the device, the section being taken on the line J—K of Fig. 2.

Equal or unequal movement about their pivots 31 is imparted to each of the operating levers 29, and consequently to the thrust rods 19 and to the rocking levers 18, by a symmetrical linkage comprising a pair of links 34 of elbow shape (Figs. 1 and 2). The shorter arms of which elbow links are pivoted together and to one end of a slidably mounted clamp 35 to the other end of which a cable 36 is secured.

The elbow links 34 are normally symmetrically arranged about an axis extending midway between and parallel to the axes of the inlet valves, and the clamp to which the cable is attached is movable along this axis by tension applied to the cable by a finger lever 52 to which the remote end of the cable is attached. The elbow links 34 each have an extension at the corner to which is pivotally connected a rod or member 48 having its opposite end pivotally connected to the respective operating lever 29.

Figures 8, 9:
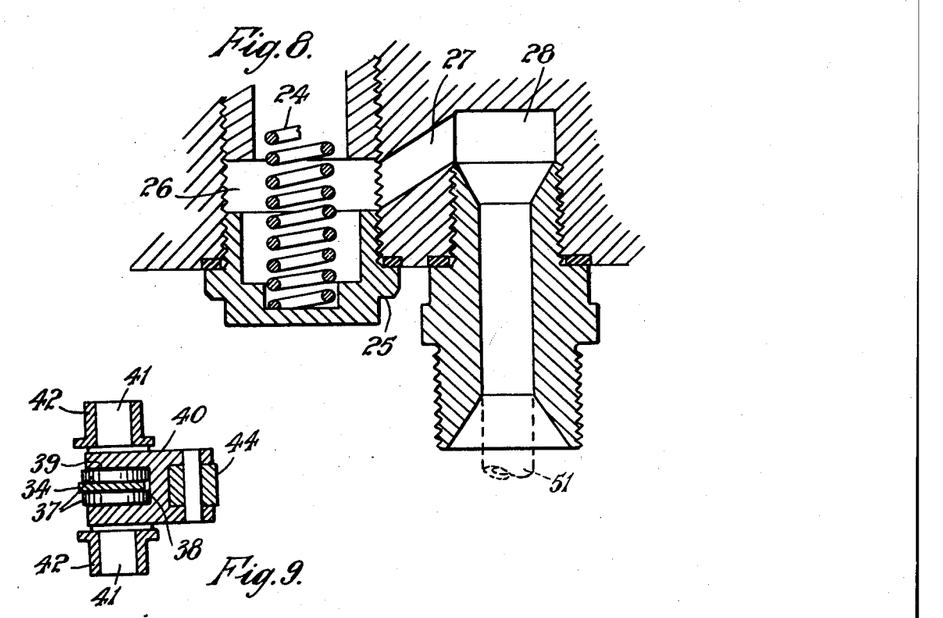
Figure 10:
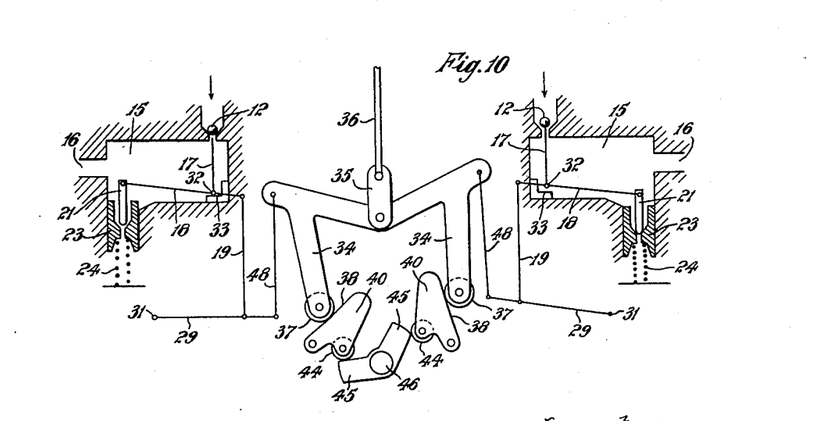
Fig. 10 is a diagrammatic representation showing the connections between the main component parts of the control unit hereinafter described.

The free end of the longer arm of each elbow link 34 is provided with flat faces and with rollers 37 of disc form rotatable on a spindle passing through the said faces at right angles. The peripheries of these elbow link rollers make rolling contact with an arcuate cam surface 38 (Figs. 2 and 9) formed by the inner edge surface of a notch or groove 39 in the base of a three-sided cradle shaped member 40. The axis of the spindle of each pair of elbow link rollers 37, when the elbow links are in the inoperative position as shown by Fig. 2, coincides with the axis of a pair of trunnions 41 which extend outwardly from the sides of the cradle shaped members 40 and carry sleeves 42 which engage bearing recesses in the casing 1 and front cover plate 43.

Each cradle shaped member 40 is provided adjacent its rear centre with a roller 44 which contacts one of a pair of rocker arms or cams 45 projecting radially from a cam-shaft 46 rotated by a crank lever 47 linked to the rudder bar. The cam-shaft 46 is positioned for partial rotation in the mid-plane of the casing 1 and along an axis at right angles to the axes of the inlet valves.

Assuming the parts of the device to be in the inoperative position and the brakes "off," the operation of the device is as follows:

The ball 12 of each inlet valve is held on its seat by the liquid pressure in the inlet valve unit body, and the end of the spindle 17 is clear of the ball.

The spring loaded outlet or exhaust sleeve 23 is at its highest position and contacting its stop and the seat of the exhaust opening 22 is clear of the rounded end of the exhaust valve spindle 21, thus maintaining an open circuit between the brakes and the reservoir and permitting any pressure liquid in the brakes to exhaust through the aperture 22 in the spring loaded sleeve and to return to the reservoir 50 via the chambers 26, passages 27, 28, and pipe 51.

When the pilot tensions the cable 36 to apply the brakes equally, the rocker arms or cams 45 and the cradle shaped members 40 are stationary about the axes of their trunnions, and the rollers 37 at the end of each of the longer arms of the elbow links 34 ride up the equally inclined arcuate cam surfaces 38 on the cams, so that equal movement is applied to the operating levers 29 and thrust rods 19. The thrust rods 19 are displaced against their return spring 30 and the rocking levers 18 are deflected with the following effects.

Each lever 18 rises slightly so that the trunnion pins 32 are moved clear of the top edge of the cradle 33 and the end of the pin 17 contacts the inlet valve ball 12 and, as this ball is held on its seat by high pressure liquid, the opposite end of the lever carrying the exhaust valve spindle 21 dips so that the said spindle closes the exhaust orifice 22. Further movement of the thrust rod due to increased cable tension causes the lever 18 to pivot about that end which is connected to the exhaust valve spindle 21 and, owing to the mechanical advantage obtained by shifting the lever pivot, the small spindle 17 is caused to move upwardly to displace the ball 12 of the inlet valve. Thus the inlet valves are open and the exhaust valves are closed.

Pressure liquid then flows into each chamber 15 and builds-up pressure there and also in the brake or brakes 49 to which each chamber is connected. The pressure on the end of the spring loaded exhaust sleeve 23 and on the valve spindle 21 moves these parts downward against the spring load, the exhaust orifice remaining closed. This causes the rocking lever 18 to tilt about its connection to the thrust rod 19 and thus the small spindle 17 is pulled downwardly away from the ball 12, which thereby permits the ball 12 of the inlet valve to re-seat itself, whereby a definite pressure is retained in the brake corresponding to the particular position of the brake applying hand lever 52 and linkage connected thereto consisting of the links 34, rod 48 and thrust rod 19.

It will be noted that the inlet and exhaust ports are out of register with each other, which arrangement prevents a direct flow of pressure on the exhaust sleeve 23 and spindle 21 when the inlet valve is first opened, thus eliminating vibration or hammering of the liquid.

To release the brakes, the pilot relieves the tension on the cable 36 whereupon the springs 30 return the thrust rods 19 and rods 48 connecting the levers 29 and links 34, and the rocking levers 18 assume a free position in which the trunnion pins 32 rest on the top edges of the cradle 33. The ball of each inlet valve remains seated, but the rounded end of each exhaust valve spindle 21 leaves the apertured seat in the spring loaded exhaust valve sleeve 23, whereupon the liquid in the brakes exhausts to the reservoir 50 via the pipes 53, chambers 15 and 26, passage 27, chambers 28 and return flow pipe 51.

Figure 12:
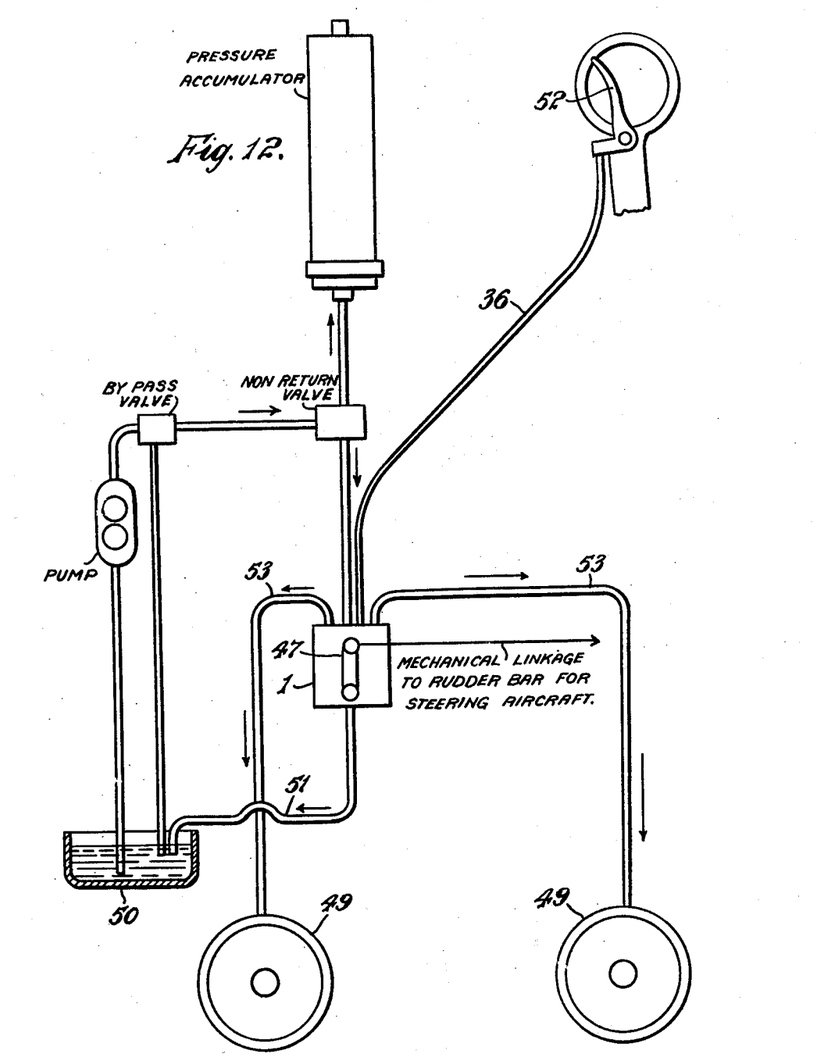
Fig. 12 shows diagrammatically the various component parts of the system to which the invention relates and also shows the connections of such parts to the control unit constructed according to the present invention.

When it is desired to apply the brakes unequally, such as when steering the aircraft on the ground, the rocker arms or cams 45 are deflected by partial rotation of the cam shaft 46 due to operation of the rudder, and the cradle shaped members 40 are caused to assume positions which are a symmetrical relative to the mid-plane of the casing, with the effect that the movement imparted to the levers 29 and thrust rods 19 at one side is unequal to the movement imparted to the levers and rods on the opposite side, and unequal brake pressure is obtained. This is clearly shown by reference to the diagram Fig. 12 in which it is assumed that, for instance, the right-hand brake is to be fully applied, whilst the left-hand brake is not to be applied.

When the rudder bar is turned hard over to the right the cam shaft 46 is rotated so that the cams or rocker arms 45 cause the left-hand member 40 to move inward to its lowest position, whilst the other member 40 is forced outwardly so that its cam face 38 is at a relatively steep inclination. When the cable 36 is tensioned, the rollers 37 on the elbow links 34 ride up the cam surfaces 38, and, owing to the fact that the right-hand cam is steeper than the other, the link 48 connected to the right-hand elbow link will move axially and the lever 29 connected to such link will thus be pivoted about the pin 31, thereby operating the thrust rod 19 and rocking lever 18, to open the inlet valve 12 and close the exhaust orifice 22, as aforedescribed.

The left-hand link 34 will pivot about its connection to the upper end of the rod 48, and the roller 37 on such link will thus roll up the surface 38 on the left-hand cam member 40. The rod 48 is itself pivotally connected to the end of the lever 29, and therefore movement of the left-hand link 34 and roller 37 does not produce any linear movement of the rod 48 or any pivotal movement of the left-hand lever 29. Thus the inlet valve 12 at the left-hand side of the diagram is not opened and no pressure liquid is admitted to the left-hand brake.

In certain cases, particularly when it is required to operate brakes of comparatively large diameter, it is desirable to provide means for passing the liquid admitted on the opening of the inlet valve direct to the brake or groups of brakes at each side of the aircraft. Thus the full pressure is available for overcoming the inertia of a heavy column of liquid in the brake pipe lines.

Figure 11:
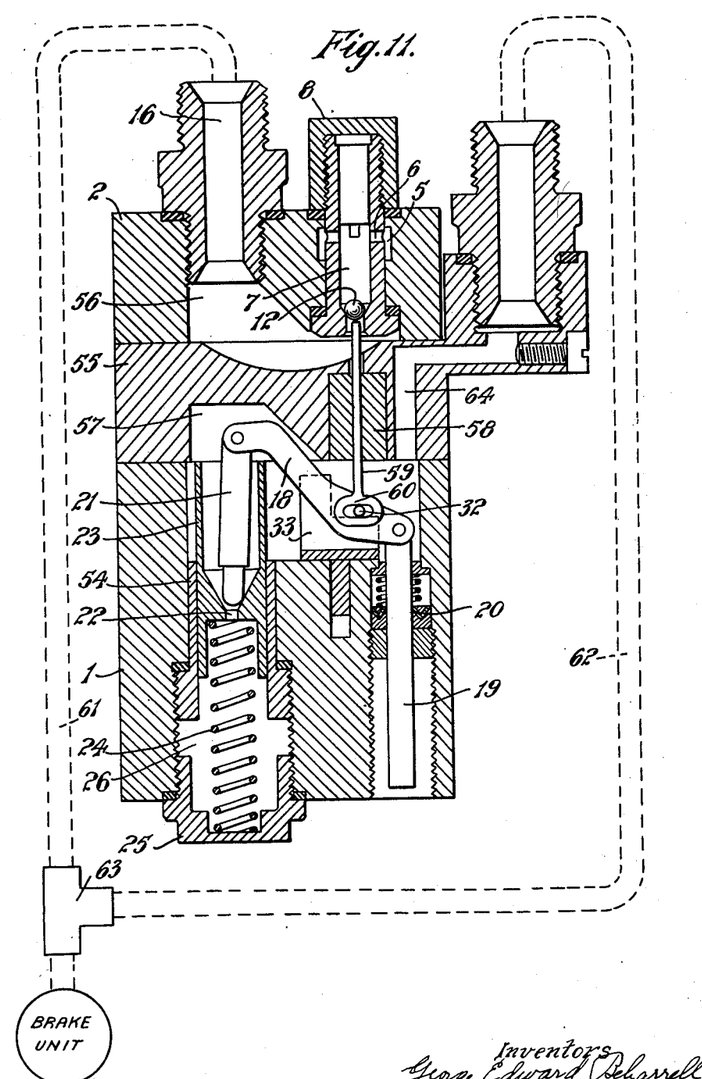
Fig. 11 is a cross-sectional elevation of a modified form of control unit.

This requirement is met by the provision of the modified control unit shown by Fig. 11, in which a body member 55 is positioned between the casing 1 and cover part 2, previously described. The member 55 forms a partition for dividing each of the aforementioned chambers 15 into two parts 56, 57. The member 55 has a bush 58 fixed thereto with its axis vertical, and such bush 58 forms a guide for a spindle 59 for operating the inlet valve ball 12. The lower end of the spindle 59 has an elongated slot 60 with which the fulcrum pin 32 of the rocking lever 18 is slidably and pivotally engaged. The rocking lever 18, thrust rod 19, operating lever 29 and connecting rod 48 are connected to elbow links 34 as previously described, whilst the lever 18 also carries an exhaust valve spindle 21 which co-operates with a spring loaded exhaust sleeve 23 as in the previously described embodiment of the invention.

The outlet from the chamber 56, in the cover part 2 is in communication with a pipe 61 connected to a brake unit, and, consequent on the opening of the inlet valve 12, the liquid flows at full pressure into the chamber 56 and through the pipe 61 to such brake unit.

In order to effect closing of the inlet valve when a predetermined pressure has been reached, the pipe 61 has a branch pipe 62 coupled thereto by a union 63 which is located as close to the brake unit as is conveniently possible. The opposite end of this pipe 62 is coupled to the member 55 so that it communicates with a passage 64 in such member, which passage opens to the chamber 57 and to the upper side of the exhaust valve sleeve 23. Thus the reaction to the liquid pressure, after the brake units have been operated, causes the pressure liquid to flow through the pipe 62, passage 64 and into the chamber 57 where the pressure is built-up to depress the exhaust sleeve 23 and spindle 21 to cause the lever 18 to rock and to effect closing of the inlet valve 12, as aforedescribed. The pipes 61 and 62 remain full of liquid under pressure until the brakes are released, when such liquid will exhaust back to the reservoir.

With the arrangements according to this invention the brake pressures are always strictly proportional to the angular movement imparted to the operating levers 29 and links connected thereto, and, as such parts are under the direct control of the pilot or other operator, very accurate braking can be obtained. Furthermore, as there are no spring loaded valves to be opened by mechanical pressure and/or linkages, a very fine control of the brake applying lever can be obtained.

The method of obtaining a differential movement of the links 34 and members connected thereto for differentially operating the levers 29 from the movement of the rudder bar, also enables perfectly proportional differential braking pressures to be applied to brakes or groups of brakes on each side of the aircraft for the purpose of steering the craft on the ground.

What we claim is—

1. Apparatus for actuating fluid pressure valves for aircraft which comprises a pressure chamber, a supply of fluid under pressure, an inlet valve from said fluid supply to said pressure chamber and closed by the pressure of said fluid, a displaceable exhaust outlet from said pressure chamber, a lever having means at one end to close said exhaust outlet and to fulcrum thereon, means connected intermediate the ends of said lever to open said inlet valve, and means operable at the other ends of said lever to tilt said lever.

2. Apparatus for controlling fluid pressure aircraft brakes which comprises a source of fluid under pressure, a pair of pressure chambers, one for each brake actuating mechanism, a pair of inlet valves, one for each pressure chamber, to control the admission of fluid from said common source to said pressure chambers, an exhaust outlet member for each of said pressure chambers, an actuating lever for each inlet valve, means connected to said lever to close and fulcrum on said displaceable exhaust outlet, means connected to said lever to tilt it, and means connected intermediate said connections to open said inlet valve.

3. Brake control apparatus which comprises a source of pressure fluid supply, a pair of pressure chambers each having a displaceable exhaust outlet and an inlet valve closed with the pressure of said fluid supply, a pair of levers, one for each pressure chamber, each said lever being freely movable relative to the displaceable outlet member of the chamber in which it is positioned to close and fulcrum on said displaceable outlet member and then to open said inlet valve proportionately to the tilting of said lever until said exhaust outlet member has been displaced to permit said inlet valve to close, and a common actuating means for the levers of both said chambers and means to proportion the action of said common actuating means between said levers.

4. A control mechanism for fluid brake systems which comprises a pressure chamber, an exhaust outlet sleeve, a spring for holding said sleeve against the pressure in said chamber, a plug freely movable from said sleeve and to close the outlet in said sleeve, a lever to which said plug is connected, a fulcrum to support said lever as a fulcrum and from which said lever may move to fulcrum on said plug when said plug closes on said outlet, an inlet valve, means connected to said lever to open said inlet valve, and means to tilt said lever, the connection between said lever, said outlet plug, said inlet valve and said actuating mechanism being such as first to close the exhaust outlet and pivot said lever to said sleeve and then to open said inlet valve until said sleeve is displaced by pressure within said pressure chamber to correspond to the tilting of said lever.

5. Apparatus for controlling the operation of fluid operated aircraft brakes which comprises a pressure chamber having an inlet valve seat and a displaceable exhaust outlet, a ball seated against said inlet valve seat to close said chamber against inflow of pressure fluid, an actuating stem movable to lift said ball from said inlet valve seat, a lever to actuate said stem, a plug supported on said lever to close said exhaust outlet when said lever is tilted to react on said plug as a fulcrum, and thereafter to displace said stem to lift said ball from said inlet valve seat, and a supporting fulcrum for said lever between said plug and the opposite end of the lever.

6. Apparatus for controlling the operation of fluid operated brakes on aircraft which comprises a pair of pressure chambers each having an inlet valve seat, an outlet member displaceable under pressure in said chamber, an inlet ball valve seating on said inlet valve seat, a tiltable lever for each chamber, a plug carried on said lever to close the outlet of its respective chamber, to fulcrum thereon and then to open said inlet ball valve, common actuating mechanism to tilt the levers of said respective pressure chambers, a supporting fulcrum for said lever between said plug and said actuating mechanism, and means to proportion the amount of displacement transmitted to either lever from said common actuating means.

7. Valve control mechanism for fluid operated aircraft brakes which comprises a pair of pressure chambers each having an inlet valve and a displaceable outlet, actuating means acting first to close said outlet, to fulcrum thereon and then open said inlet valve, a common actuating mechanism for said valve, actuating means comprising tiltable connecting members, and a pair of independently tiltable cam guides to control the tilting of said tiltable members, said tiltable members transmitting the displacement of said actuating members inversely to the tilting of said tilting members.

8. The mechanism of claim 7 in which there is a common control to permit the tilting of either of said tilting guide members.

9. Apparatus for controlling the operation of fluid controlled aircraft brakes having a pair of pressure chambers each having an inlet valve and an outlet, valve actuating mechanism acting first to close said outlet and, to react thereon to close said inlet, manually actuated means to apply pressure to said control mechanism and comprising a pair of links pivoted together and to an actuating cable and to said valve actuating mechanism at a point out of alignment with its connection with said cable to produce a force couple on each of said links, a cam member for each link to restrain the action of said force couple on said link, and means to displace said cam to control the turning of said links under said force couple.

10. Control mechanism for fluid actuated aircraft brakes which comprises a pressure supply chamber and a pressure exhaust chamber separate therefrom, a pipe connecting said exhaust chamber and said pressure supply chamber, an inlet valve for said pressure supply chamber and a displaceable outlet valve seat for said exhaust pressure chamber, a lever having a closure to seat on and react on said outlet valve seat and tiltable on said seat as a fulcrum, and means moved by said tilting of said lever to open said inlet valve to said pressure supply chamber until said outlet valve seat is displaced a distance proportionately to the tilting of said lever.

GEORGE EDWARD BEHARRELL.
JOSEPH WRIGHT.
HENRY TREVASKIS.